United States Patent [19]

Cousino et al.

[11] 4,221,032
[45] Sep. 9, 1980

[54] METHOD OF FORMING EXPANDED METAL GRIDS PARTICULARLY LEAD GRIDS FOR STORAGE BATTERY PLATES

[75] Inventors: Bernard A. Cousino, Fort Myers, Fla.; Walter E. Cousino, Toledo, Ohio; John T. Redmon, Fort Myers, Fla.

[73] Assignee: Cousino Impact Corporation, Fort Myers, Fla.

[21] Appl. No.: 27,100

[22] Filed: Apr. 4, 1979

[51] Int. Cl.³ .................. B21D 31/04; B21D 47/02
[52] U.S. Cl. ............................................ 29/2; 29/6.1
[58] Field of Search .................. 29/2, 6.1, 6.2, 623.1; 72/203

[56] References Cited

U.S. PATENT DOCUMENTS

| 1,797,506 | 3/1931 | Kessler | 29/6.1 |
| 2,692,019 | 10/1954 | Zalkind | 29/6.1 |
| 3,853,626 | 12/1974 | Daniels, Jr. et al. | 29/2 |

*Primary Examiner*—Horace M. Culver
*Attorney, Agent, or Firm*—Wilson, Fraser, Barker & Clemens

[57] ABSTRACT

The invention provides a novel method of formation and structure of a slitted strip of metal, such a lead, which is to be expanded into a reticulated configuration. As applied to a battery plate, the invention contemplates the formation of a continuous strip of a lead or lead alloy material wherein the central portion of the strip which is to form the unexpanded current collecting top header portions of the finished battery plates is provided with a plurality of longitudinally extending punched apertures extending along the edge of the solid central portion and separating the solid central portion from slitted portions of the strip which are subsequentially expanded to form a reticulated grid. The formation of the continuous lead strip in such fashion substantially minimizes the "gull-wing" effect produced by the subsequent expansion of the slitted portions of the lead sheet. By gull-wing effect is meant the tendency of the lead strip to curl about an axis transverse to the movement of the strip through the expanding mechanism.

12 Claims, 4 Drawing Figures

METHOD OF FORMING EXPANDED METAL GRIDS PARTICULARLY LEAD GRIDS FOR STORAGE BATTERY PLATES

BACKGGROUND OF THE INVENTION

It has previously been proposed, for example in U.S. Pat. No. 3,853,626 to Daniels, Jr. et al, that lead battery grids be made by an expanded metal technique wherein a plurality of opposed pairs of battery grids are produced from a narrow sheet or strip of lead utilizing a modified, in-line, dual-expansion process similar to that employed in making expanded metal lathe or fencing. Each grid produced would comprise an unexpanded, current collecting top header portion and an expanded reticulated portion depending from the header. The two header portions would each be formed from the central portion of the original narrow sheet or strip of lead and such central portion would not be subjected to any expansion operations, but must, of course, necessarily be subject to any stresses induced in the stretching or expanding operation performed on the slitted portions which extend from a line adjacent the unexpanded central header portion to each edge of the strip.

As stated in the aforementioned patent No. 3,853,626, the expansion of the slitted portions of the lead strip has the tendency to curl the strip about an axis transverse to the path of movement of the continuous strip through the expansion operation. This tendency to curl results in what is known in the art as the "gull-wing" effect and has heretofore required that special rolls or other forms of straightening apparatus be added to the expanding machine to accomplish the reformation of the expanded metal strip into a uniform plane, rendering the strip suitable for entering continuous pasting machines and other subsequent operations.

OBJECTS OF THE INVENTION

It is an object of this invention to substantially eliminate the "gull-wing" effect which has heretofore been inherent in the lateral expansion of a slitted metal portion relative to an unsitted portion of a continuous metal strip. More particularly, this invention provides a stress absorbing row of punched out or stamped apertures intermediate the slitted and unslitted portions of the metal strip and such stamped or punched portions are effective in greatly minimizing the transmission of curling forces to the unslit central or edge portions of the strip, thereby minimizing the "gull-wing" effect.

Further objects and advantages of this invention will become apparent to those skilled in the art through the following detailed description taken in conjunction with the annexed sheets of drawings.

DESCRIPTION OF PREFERRED EMBODIMENTS

Figure 1:
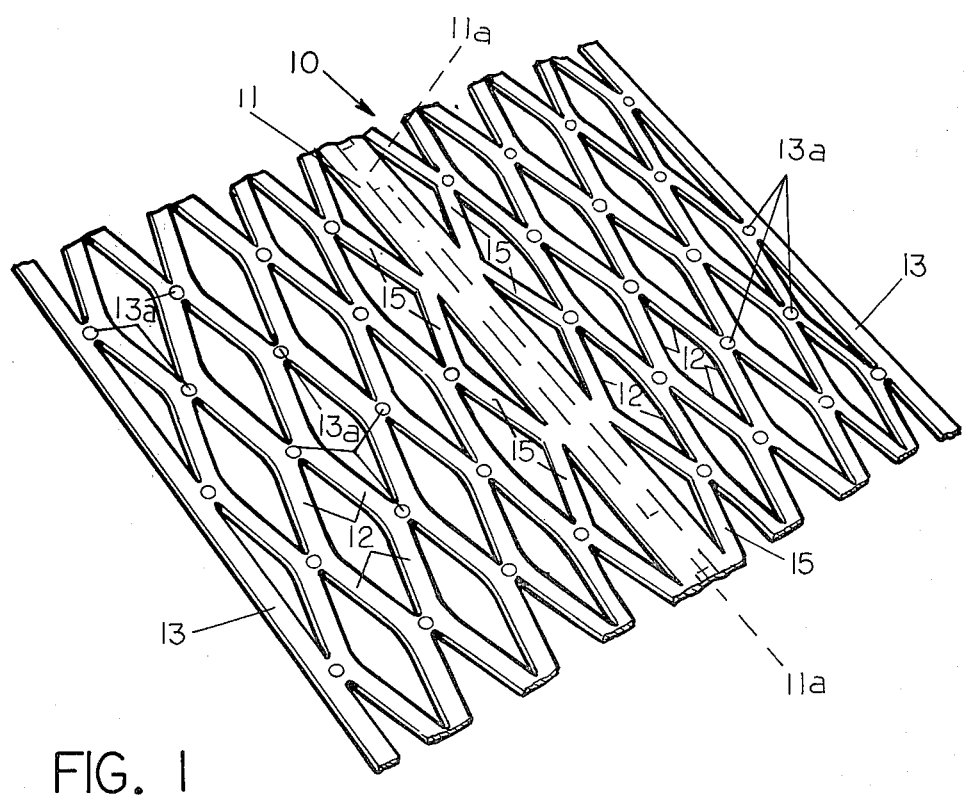
FIG. 1 is a perspective view of a finished strip of expanded metal, suitable for fabrication into battery grids, which has been constructed in accordance with this invention.

Referring to FIG. 1, there is illustrated a continuous strip 10 of expanded metal suitable for fabrication into individual battery grids by a subsequent shearing operation separating the strip along the dotted lines indicated in FIG. 1. It will be seen that the strip 10 comprises a solid central metal portion 11 from which the header portions 11a of two adjacent battery grids are later fabricated as indicated by the dotted lines. The header portion 11 is integrally connected with a plurality of diamond-shaped, interconnected grid wires 12 which in turn are integrally connected at their outer edges with a substantially straight line boundary strip 13. At each of the interstices of the grid wires 12, there is preferbly provided an upstanding mass of metal 13a, hereinafer called a nodule which, as is well known to those skilled in the art, performs an important function after the coating of the grid with an appropriate composition to convert the grid into an active positive or negative plate for a storage battery.

Figure 2:
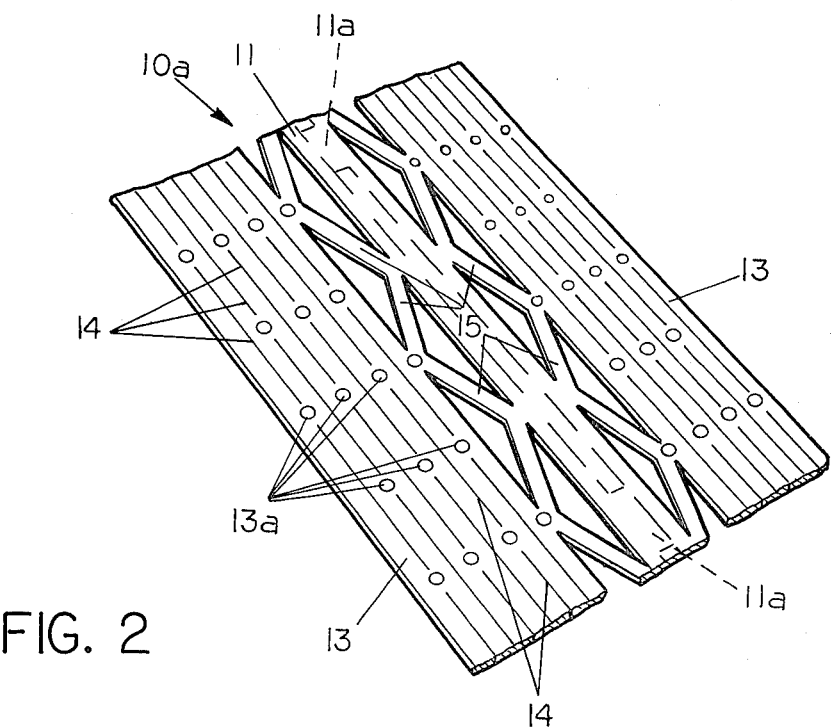
FIG. 2 is a schematic perspective view of the metal strip to be expanded, showing it in the condition after the initial forming operation.

Referring now to FIG. 2, the strip 10 of FIG. 1 is continuously fabricated by two successive operations on a solid endless strip of metal. In the case of battery grids the metal would, of course, be a lead alloy.

In the initial fabrication step, which can be accomplished by impact actuated stamping dies, the solid strip 10a is provided with a plurality of axially and laterally spaced slits 14 which effectively divide both laterally outer portions of the strip 10 into the grid arms 12 after a subsequent expansion operation. Concurrently with the formation of slits 14, the nodules 13a are formed. If desired, the grid wires 12 may have their cross-section formed in any desired pattern, for example they may be diamond-shaped in vertical cross-section rather than the rectangular cross-section indicated in the drawings. Additionally, the formation of the nodule 13a at this stage in the manufacture insures that there is a sufficient mass of metal at the juncture of each of the grid wires 12 to guard against inadvertent splitting of the grid wires at such junctures in the subsequent expanding operation.

The important feature of this invention is the complete formation in the stamping operation of the first set of wires 15 which are disposed immediately adjacent to the central solid strip 11. Wires 15 will hereinafter be referred to as the stress relieving elements of the finished grid configuration. They may be shaped to generally conform to the pattern of the expanded grid wires, as shown in FIG. 1 or, one shown in the modification of this invention illustrated in FIG. 3, they may comprise relatively longitudinally extending grid wire elements 25 separated from the central solid portion 11 of strip 20 by a horizontally elongated slot 25a.

Figure 3:
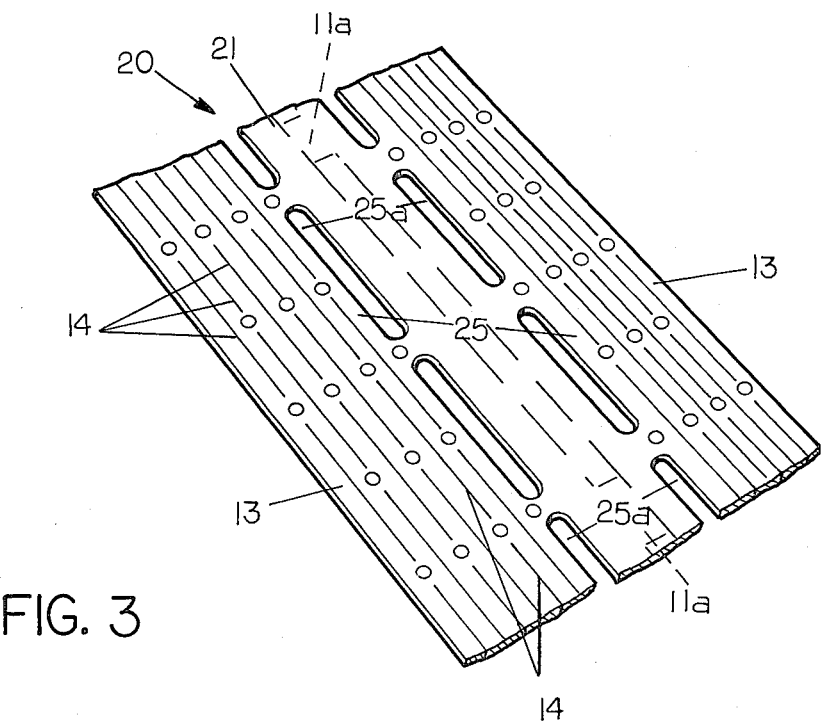
FIG. 3 is a schematic perspective view similar to FIG. 2 of a modified form of metal strip fabricated in accordance with this invention.
Figure 4:
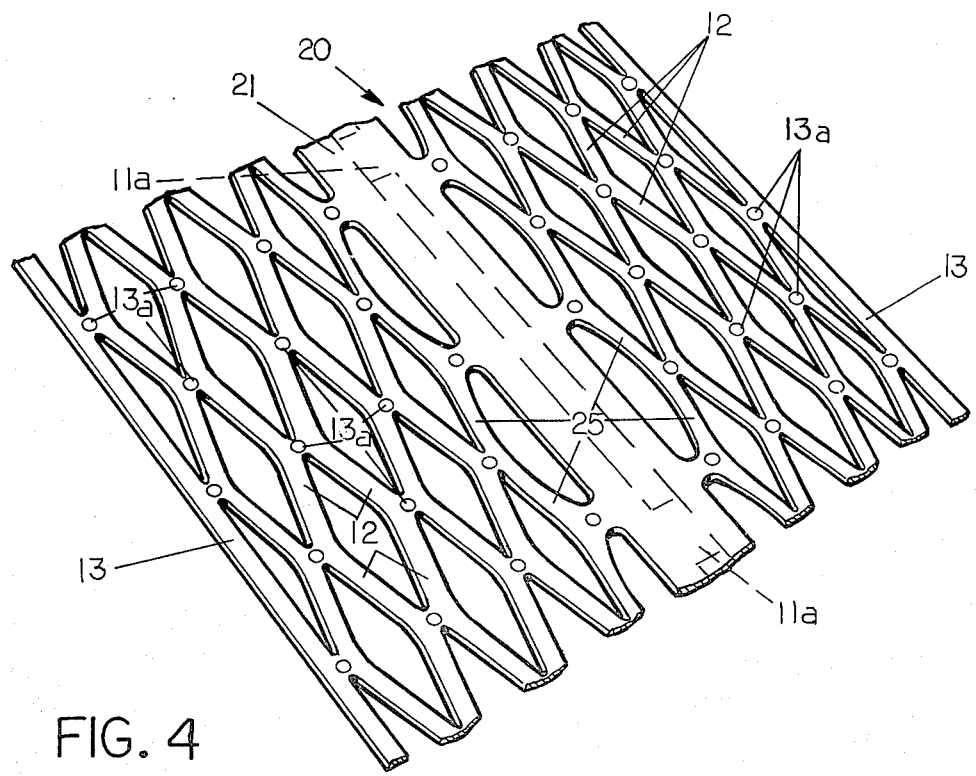
FIG. 4 is a schematic perspective view of the metal strip of FIG. 3 after the expansion is completed.

In either event, the next step in the conversion of the initial form of the grid 10 into the final, expanded form illustrated in FIG. 1, is the application of lateral expansion forces to both sides of the slitted strips of the modifications of FIGS. 2 and 3. Such application of lateral expanding forces is a technique well known in the expanded metal art and a variety of apparatus has heretofore been disclosed in such art for effecting such expansion, hence this step of the operation will not be described in any further detail. In any event, the initial slitted strips 10 and 20 of the modifications of FIGS. 2 and 3 are expanded to assume the configurations respectively illustrated in FIGS. 1 and 4.

It is well known that the lateral expansion of a slitted strip produces forces on the central strip 11 or 21 and the lateral edge strips 13 which tend to make the continuous strip curl about a transverse axis. This phenomena is referred to in the art as the "gull wing" effect. When the slitted strip is preliminarily formed in the manner illustrated in FIGS. 2 and 3 with stress relieving wires stamped out of the strip, the tendency of the expanded strip to curl is significantly diminished, in fact, to the extent that no subsequent rolling operation is required to restore the continuous strip to a sufficiently flat condition as to permit its further processing. Instead of the longitudinal forces exerted by the grid wires 13 during the expanding operation being exerted on the solid central strip 11 in FIG. 2, or strip 21 in FIG. 3, such forces are primarily exerted on the pre-formed grid wires 15 or 25 and effectively absorbed by such preformed grid wires.

If desired, pre-formed grid wires could also be provided adjacent the lateral edge strips 13 and such would function in the same manner to further reduce the tendency of the total strip to curl about a transverse axis.

Modifications of this invention will be readily apparent to those skilled in the art and it is intended that the scope of the invention be determined solely by the appended claims.

We claim:

1. A method of forming a plurality of interconnected lead battery grids comprising the steps of:
   (1) feeding a continuous strip of a lead base material along a linear path aligned with the length axis of the strip;
   (2) punching out a continuous series of apertures linearly spaced along said strip and located transversely between a medial portion of said strip and one edge of said strip thereby leaving an unpunched band adjacent said one edge of said strip;
   (3) forming a continuous series of longitudinal slits in said unpunched band longitudinally and laterally spaced relative to each other and located between said apertures and said one edge of said strip but not extending into said apertures and
   (4) laterally expanding said strip to convert said slitted portion into a reticulated configuration with minimal distortion of said medial portion out of its original plane.

2. The method defined in claim 1 wherein steps (2) and (3) are performed concurrently.

3. The method forming a plurality of interconnected lead battery grids comprising the steps of:
   (1) feeding a continuous strip of a lead based material along a horizontal linear path aligned with the length axis of the strip;
   (2) punching out two continuous series of apertures linearly spaced along said strip and respectively located transversely between the center of said strip and each lateral edge of said strip, thereby producing a solid central band of unpunched material;
   (3) forming a continuous series of longitudinal slits in said strip longitudinally and laterally spaced relative to each other and located between said apertures and each said edge of said strip but not extending into said apertures and
   (4) laterally expanding said strip to convert said slitted portions into a reticulated configuration with minimal distortion of said central band out of its original plane.

4. The method defined in claim 3 wherein steps (2) and (3) are performed concurrently.

5. A method of forming a plurality of lead battery grids comprising the steps of:
   (1) feeding a continuous strip of a lead base material along a linear path aligned with the length axis of the strip;
   (2) punching out a continuous series of apertures linearly spaced along said strip and located transversely between a medial portion of said strip and one edge of said strip, thereby leaving an unpunched band adjacent said one edge of said strip;
   (3) forming a continuous series of longitudinal slits in said unpunched band longitudinally and laterally spaced relative to each other and located between said apertures and said one edge of said strip but not extending into said apertures;
   (4) laterally expanding said strip to convert said slitted portion into a reticulated configuration with minimal distortion of said unpunched band out of its original plane, and
   (5) stamping successive lengths of said strip to form a plurality of battery grids having a solid header portion formed from the medial portion.

6. The method defined in claim 5 wherein steps (2) and (3) are performed concurrently.

7. The method forming a plurality of lead battery grids comprising the steps of:
   (1) feeding a continuous strip of a lead based material along a linear path aligned with the length axis of the strip;
   (2) punching out two continuous series of apertures linearly spaced along said strip and respectively located transversely between the center portion of said strip and each lateral edge of said strip, thereby producing a solid central band of unpunched material;
   (3) forming a continuous series of longitudinal slits in said strip longitudinally and laterally spaced relative to each other and located between said apertures and each said edge of said strip but not extending into said apertures;
   (4) laterally expanding said strip to convert said slitted portion into a reticulated configuration with minimal distortion of said unpunched band out of its original plane; and
   (5) transversely severing successive lengths of said expanded strip to form battery grids.

8. The method defined in claim 7 wherein steps (2) and (3) are performed concurrently.

9. A method of forming an expanded metal grid integrally connected between two solid edge bands comprising the steps of:
   (1) feeding a continuous strip of sheet metal along a linear path aligned with the length axis of the strip;
   (2) punching out a continuous series of apertures linearly spaced along the strip and located adjacent one edge of the strip, thereby defining one solid edge band;
   (3) punching out a second continuous series of apertures linearly spaced along said strip and located adjacent the other edge of the strip;
   (4) forming a continuous series of longitudinal slits in the strip longitudinally and laterally spaced relative to each other and located between said apertures but not extending into said apertures; and
   (5) laterally expanding said strip to convert said slitted portion into a reticulated configuration with minimal distortion of said edge bands out of their original plane.

10. The method defined in claim 9 wherein steps (2), (3) and (4) are performed concurrently.

11. The method forming an expanded metal grid with a central solid band portion comprising the steps of:
(1) feeding a continuous strip of sheet metal along a horizontal linear path aligned with the length axis of the strip;
(2) punching out two continuous series of apertures linearly spaced along said strip and respectively located transversely between the central portion of said strip and each lateral edge of said strip, said central portion defining the said solid band portion;
(3) forming a continuous series of longitudinal slits in said strip longitudinally and laterally spaced relative to each other and located between said apertures and each said edge of said strip but not extending into said apertures, and
(4) laterally expanding said strip to convert said slitted portion into a reticulated configuration with minimal distortion of said central portion out of its original plane.

12. The method defined in claim 11 wherein steps (2) and (3) are performed concurrently.

* * * * *